Figure 1:
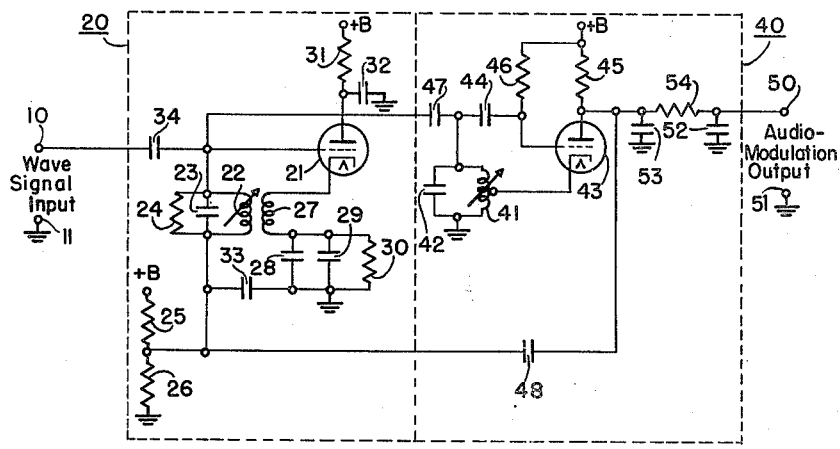

Oct. 7, 1952       B. D. LOUGHLIN       2,613,316

ANGULAR-VELOCITY-MODULATION WAVE-SIGNAL TRANSLATING SYSTEM

Filed June 25, 1948       2 SHEETS—SHEET 1

*INVENTOR.*
BERNARD D. LOUGHLIN

BY John R. Harvey

ATTORNEY

Oct. 7, 1952  B. D. LOUGHLIN  2,613,316
ANGULAR-VELOCITY-MODULATION WAVE-SIGNAL TRANSLATING SYSTEM
Filed June 25, 1948  2 SHEETS—SHEET 2

*INVENTOR.*
BERNARD D. LOUGHLIN
BY John A. Harvey
ATTORNEY

Patented Oct. 7, 1952

2,613,316

UNITED STATES PATENT OFFICE 2,613,316

ANGULAR-VELOCITY-MODULATION WAVE-SIGNAL TRANSLATING SYSTEM

Bernard D. Loughlin, Lynbrook, N. Y., assignor to Hazeltine Research, Inc., Chicago, Ill., a corporation of Illinois Application June 25, 1948, Serial No. 35,257

6 Claims. (Cl. 250—20)

The present invention is directed to angular-velocity-modulation wave-signal translating systems of the phase sampling type; that is, systems in which the phase of an applied angular-velocity-modulated signal is periodically examined to determine, on the basis of a change in phase from one sampling interval to the next, the modulation of the applied signal. The system to be described may be employed in a variety of installations and is particularly useful as a receiver for deriving the modulation components of either a frequency-modulated or a phase-modulated signal, generically defined as a signal exhibiting angular velocity modulation.

The present invention is related to a sampling type of system disclosed and claimed in applicant's copending application Serial No. 788,569, filed November 28, 1947, and entitled "Angular-Velocity-Modulated Wave-Signal Receiver." In the arrangement of this copending application, sampling is effected by the use of a pulse-modulated amplifier stage such as a superregenerative amplifier which inherently has a pulsed mode of operation. The output signal obtained from the stage may be shown to have a radiation or energy pattern including pulse-modulation components spaced from one another in the frequency spectrum by the value of the quench frequency and angular-velocity-modulated in accordance with the modulation of the applied signal. Therefore, any of these pulse-modulation components may be utilized to derive the desired angular-velocity-modulation components of the applied signal. To that end, a frequency-selective detector is coupled to the stage to select and utilize a particular pulse-modulation component. The quench frequency may be chosen to have a value not exceeding the maximum frequency swing of the applied signal and, in order to avoid interference from the adjacent pulse-modulation components in the radiation pattern, a fast automatic-frequency-control system or the like effects a frequency adjustment to maintain substantially only the selected pulse-modulation component within the acceptance band of the detector.

The present invention, in one aspect, may be construed as a generally similar sampling system except that the present system includes a detector which may accept several of the pulse-modulation components of the radiation pattern and effectively presents individual angular-velocity-modulation detection characteristics for each of the several components, thereby to derive the modulation components of the applied signal. The arrangement to be described has further distinctive features. For example, it develops a signal which is pulse-time-modulated in accordance with the angular velocity modulation of the applied signal and, viewed in that light, it may be considered as a converter, converting from angular velocity modulation to pulse time modulation. This is especially advantageous for inclusion in multiplex systems wherein information is conveyed by means of pulse time modulation. One specific form of the invention employs a pair of superregenerative wave-signal translating devices which, for convenience, may be called "superregenerators". That form of the invention also constitutes a frequency-deviation divider which develops a signal having a frequency-deviation range that is a submultiple of the deviation range of an applied signal.

It is an object of the invention to provide a new and improved angular-velocity-modulation wave-signal translating system of the sampling type.

It is another object of the invention to provide an improved system of the sampling type which effects conversion from angular velocity modulation to pulse time modulation.

It is an additional object of the invention to provide a new and improved system of the sampling type, featuring the use of a self-quenching superregenerator, for translating an angular-velocity-modulated wave signal to derive the modulation components thereof or to convert the angular velocity modulation thereof into pulse time modulation.

Another object of the invention is to provide a novel frequency-deviation divider for developing an angular-velocity-modulated signal having frequency deviations which are subharmonically related to those of an applied signal.

In accordance with one feature of the invention, a receiving system of the phase comparison type for translating an angular-velocity-modulated wave signal comprises a source of phase-reference oscillations and a superregenerative amplifier to which the aforesaid modulated signal is applied, the amplifier being effective in each quench cycle to generate oscillations having a phase varying with the phase of the modulating signal. The receiving system also includes a phase detector comprising a blocking oscillator including the aforesaid source for receiving the oscillations of the amplifier and for comparing during spaced intervals the apparent phase of the reference oscillations and the amplifier oscillations to develop an output signal having characteristic variations representing the modulation components of the modulated signal. The receiving system further includes a control network responsive to the phase relations of the reference oscillations and the amplifier oscillations during the intervals of phase comparison for controlling a frequency characteristic of the system to tend to maintain a substantially fixed apparent phase relation between the reference oscillations and the amplifier oscillations.

In accordance with another feature of the invention, an angular-velocity-modulation wave-signal translating system of the sampling type comprises an externally quenched superregenerative wave-signal repeater for sampling the phase of an applied angular-velocity-modulated signal during each of a series of spaced sampling intervals. An oscillatory circuit is coupled to the repeater to develop a reference signal having a phase dependent upon the phase of the output signal of the repeater and having an effective time constant of damping exceeding the maximum separation of the sampling intervals. The system includes a phase comparator, comprising a self-quenching superregenerator including the above-mentioned oscillatory circuit and effectively responsive to the reference signal and to the applied signal during a series of comparing intervals which alternate with and are spaced from corresponding ones of the sampling intervals, for developing a third signal having a characteristic frequency corresponding to the self-quenching frequency of the self-quenching superregenerator and varying with the relative phase of the applied and the reference signals. There is also provided means for applying the third signal as a quench signal to the repeater to determine the repetition frequency of the sampling intervals.

For a better understanding of the present invention, together with other and further objects thereof, reference is had to the following description taken in connection with the accompanying drawings, and its scope will be pointed out in the appended claims.

Figure 4:
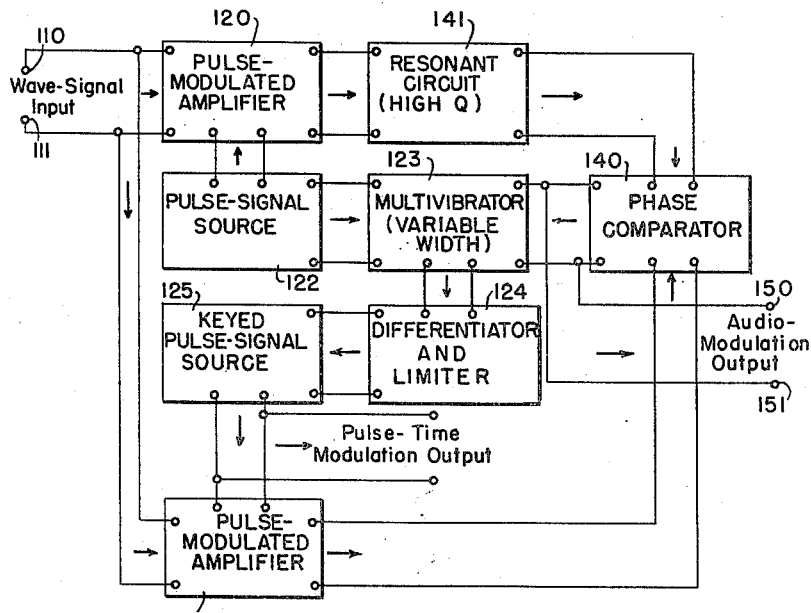

In the drawings, Fig. 1 is a circuit diagram of an angular-velocity-modulation wave-signal translating system embodying the invention in one form; Fig. 2 and Figs. 3a–3f, inclusive, comprise graphs utilized in explaining the operating characteristics of the arrangement of Fig. 1; Fig. 4 is a schematic representation of another wave-signal translating system embodying the invention in a modified form; and Figs. 5a–5d, inclusive, comprise curves used in explaining the operation of the arrangement of Fig. 4.

Referring now more particularly to Fig. 1, the arrangement there represented may be considered as a translating system or a receiver of the phase sampling type for translating an applied angular-velocity-modulated carrier-wave signal having a given maximum frequency swing. As here used, the expression "maximum frequency swing" is intended to mean the difference between the maximum and minimum values of frequency of the received signal when modulated to 100 per cent. modulation. This receiver has input terminals 10 and 11 to which the received signal may be applied from any convenient source, such as an antenna system (not shown). Terminals 10 and 11 are connected to the input circuit of a pulse-modulated wave-signal repeater, included within broken-line rectangle 20, adapted to sample the phase of an applied angular-velocity-modulated signal during each of a series of spaced sampling intervals. While unit 20 may comprise a conventional radio-frequency amplifier to which a pulse-modulation signal is applied to accomplish pulse-modulated amplification, it is convenient to use a superregenerative amplifier as represented in the drawings.

Superregenerator 20 is provided by a triode vacuum tube 21 and an associated frequency-determining circuit including the parallel combination of an inductor 22, a condenser 23 and a damping resistor 24. The inductor may be adjustable, as indicated, to determine the operating frequency of the superregenerator and suitably to position its response characteristic in the frequency spectrum relative to the mean frequency of the applied angular-velocity-modulated signal. Condenser 23 may be comprised in whole or in part of the distributed capacitance of inductor 22 and stray capacitance effects associated therewith. One terminal of the frequency-determining circuit is conductively connected with the control electrode of tube 21 and the opposite terminal is connected to a voltage-divider network, comprising serially connected resistors 25 and 26 which are coupled to a source of potential designated +B. The cathode circuit of tube 21 includes a feed-back inductor 27, inductively coupled with inductor 22, and is completed to ground through a stabilizing network comprising shunt-connected condensers 28 and 29 and a resistor 30. A detailed description of such a stabilizing network and its mode of operation are fully disclosed and claimed in applicant's copending application Serial No. 753,236, filed June 7, 1947, and entitled "Superregenerative Receiver." A condenser 33 is coupled across the voltage-divider resistor 26 to by-pass radio-frequency signals from the voltage-divider network. The anode of tube 21 is connected to a source of space current +B through a decoupling resistor 31 and is coupled to ground for radio-frequency signals by a condenser 32. The input circuit of the superregenerator 20 is coupled to input terminals 10 and 11 through a coupling condenser 34. This superregenerator is of the separately quenched type and its quench-signal source will be described presently.

The receiver under consideration also includes an oscillatory circuit coupled to the superregenerator 20 to develop a reference signal or phase-reference oscillations having a phase dependent upon the phase of the output signal obtained from the superregenerator. This oscillatory circuit is included within the broken-line rectangle 40 and is provided by the parallel combination of an inductor 41 and a condenser 42. Inductor 41 is adjustable to determine the oscillatory frequency of this circuit, which frequency preferably is chosen to be substantially different from the mean frequency of the applied signal and from the operating frequency of the superregenerator 20. Also, circuit 41, 42 is chosen to have a high Q (i. e., a large ratio of inductive reactance to resistance) and thus a low decrement so that its time constant of damping exceeds the maximum time separation of the sampling intervals established for unit 20 in a manner to be described hereinafter.

The receiver additionally includes a phase comparator for developing a third signal having a characteristic which represents or varies with the apparent relative phase of the applied angular-velocity-modulated signal and the reference signal of circuit 41, 42. This comparator is in the form of a second superregenerator of the self-quenched type which includes circuit 41, 42 as its frequency-determining or tank circuit. The second superregenerator is provided by an additional vacuum tube 43 having a control electrode coupled through a self-bias condenser 44 to one terminal of its frequency-determining circuit 41, 42. The cathode of tube 43 is connected to a tap on inductor 41, while its anode is coupled to a source of space current +B through a resistor 45. A resistor 46 is coupled between the energizing source +B and the control electrode of the tube 43, while a coupling condenser 47 couples the superregenerator 40 with the superregenerator 20.

As will be made clear hereinafter, the self-quenching frequency of superregenerator 40 and, therefore, the average space current of tube 43 vary with the angular velocity modulation of the signal applied to terminals 10, 11. By virtue of this, the modulation components of the applied signal are derived in the output circuit of the tube 43 and are applied through a filter comprising shunt condensers 52 and 53 and a series resistor 54 to a pair of output-circuit terminals 50, 51 of the receiver. The filter 52, 53 and 54 is designed to suppress the quench-frequency and radio-frequency components of the anode current of tube 43 so that only the derived modulation components arrive at output terminals 50, 51.

The phase comparator 40 accomplishes the desired phase comparison above mentioned during a series of comparing intervals, to be discussed more fully hereinafter, which alternate with and are spaced from corresponding ones of the sampling intervals established in unit 20.

In addition to deriving the modulation components of the applied signal, the system of Fig. 1 also produces a pulse time modulation representing the angular velocity modulation of the applied signal. This is accomplished by varying a characteristic time component of at least one of the series of sampling or comparing intervals. As is well understood, characteristic time components of pulse intervals include the repetition rate, the pulse duration, and the time separation of successive pulses. In the embodiment of Fig. 1 a conversion from angular velocity modulation to pulse time modulation is accomplished by varying the repetition frequency or rate of both the sampling and comparing intervals in accordance with a characteristic of a third signal, generated in unit 40 and modulated in accordance with the modulation of the signal applied to terminals 10, 11.

Condenser 53, which may be charged from source +B through resistor 45 and discharged through the anode-cathode path of tube 43, generates a signal for application through condenser 48 as a quench signal to a control circuit of unit 20, namely to the control-electrode circuit of tube 21, to control the operation of unit 20 and thereby to control the time characteristics of the sampling intervals. Additionally, the control-electrode circuit of tube 43 responds to the oscillations generated in superregenerator 40 in each quench cycle to effect self-quenching of the latter and determine the characteristic time components of the comparing intervals established in that unit. Thus, the superregenerators 20 and 40 have synchronized quench frequencies because one drives the other.

In considering the operation of the arrangement of Fig. 1, it will be assumed that the quench frequency of superregenerator 20 is high relative to the highest modulation frequency of the angular-velocity-modulated signal applied to terminals 10, 11, preferably being at least twice as high as the highest modulation frequency. The value and wave form of the quench frequency will be considered more particularly hereinafter. In the presence of the applied quench signal, the conductance of the regenerative oscillatory system, including tube 21 and the frequency-determining circuit 22—23—24, is varied to have positive and negative values in alternate operating intervals as is characteristic of superregenerative action. In each negative-conductance interval, oscillations are generated in the oscillatory system of unit 20 and quickly build up to a saturation-level amplitude and are thereafter damped or quenched as the system experiences a period of positive conductance. This is typical saturation-level mode superregenerative operation. The positive damping of the oscillatory system is sufficiently large that the oscillations produced in any negative-conductance interval are substantially completely quenched before the system enters upon the next succeeding interval of negative conductance.

With an angular-velocity-modulated signal applied to input terminals 10, 11, the phase of the oscillations generated in any negative-conductance interval is related to and varies with the phase of the applied signal as the oscillatory system arrives at its maximum-sensitivity period. The maximum-sensitivity period is that period when the conductance of the system has a zero value in a transition from a positive to a negative value of conductance. In view of the quenching process and the periodic generation of oscillations in unit 20 having a phase influenced by the phase of the applied signal during successive periods of maximum sensitivity, unit 20 may be thought of as sampling the applied signal during short pulse intervals corresponding with the short periods of maximum sensitivity. This pulse-modulated operation of unit 20 develops in its output circuit a pulse-modulated wave signal.

Figure 2:
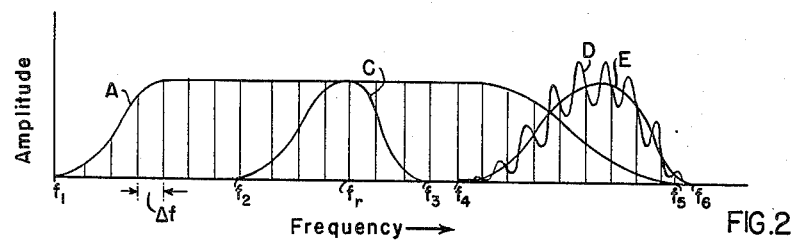

Curve A of Fig. 2 represents the envelope of the energy or radiation pattern of the output signal of unit 20. The ordinate lines shown in full-line construction represent a series of pulse-modulation side-band components distributed throughout the frequency spectrum with a separation $\Delta f$, between any two succeeding components, which equals the quench frequency. Inasmuch as the phase of the several pulse-modulation components in any pulse or sampling interval is related to the instantaneous phase of the applied signal at the start of the sampling, each of these pulse-modulation side-band components is angular-velocity-modulated in like manner in accordance with the modulation of the applied signal. Any may be detected to derive the desired modulation components and this is accomplished in unit 40.

Curve C of Fig. 2 represents the frequency-response or selectivity characteristic of unit 20. The response band is designated $f_2$—$f_3$ and includes the frequency range of the signal applied to input terminals 10, 11, this signal having a means frequency $f_r$ which preferably is centered within the band $f_2$—$f_3$. The radiation pattern, on the other hand, extends over a second frequency band $f_1$—$f_5$ and this latter band by virtue of the pulse mode of operation of unit 20 may be considerably broader than the response range $f_2$—$f_3$. The frequency-response or selectivity characteristic of the self-quenching superregenerator 40 is represented by the curve D which may be understood most readily by considering unit 40 initially to have the response shown by smooth curve E.

Curve E represents the frequency-response characteristic of a superregenator wherein the oscillations generated in one quench cycle are substantially completely quenched before the next succeeding quench cycle. The actual response of curve D is obtained because the previously mentioned low decrement of circuit 41, 42 causes this circuit to continue to oscillate throughout the positive-conductance intervals, establishing what is known as "ringing" or "carry-over." Carry-over, in general, is a condition in which oscillations generated in one negative-conductance interval endure throughout the following positive-conductance interval and influence the oscillations generated in the next succeeding negative-conductance interval. Carry-over distorts the selectivity characteristic from the smooth curve E to that of curve D by introducing a ripple component occurring at the quench frequency.

It is apparent that the response band $f_4$—$f_6$ of the self-quenching superregenerator 40 overlaps and includes a substantial portion of the radiation pattern of curve A of the first superregenerator 20. This relationship is necessary to permit the self-quenching superregenerator 40 to be excited by the preceding separately quenched superregenerator 20. The radiation pattern of the self-quenching superregenerator 40 has not been shown in Fig. 2 because it would confuse the representation but it may be considered to be centered about its selectivity curve. The oscillating frequency of unit 40 must be positioned in the frequency spectrum to be effectively exclusive of the response band $f_2$—$f_3$ of unit 20 in order that the ringing action of the self-quenching superregenerator may not adversely influence the operation of the first superregenerator 20. The oscillating frequency of unit 40 is in the center of its acceptance band $f_4$—$f_6$ and the lattery may, if desired, partially overlap the acceptance band $f_2$—$f_3$ of unit 20. An appropriate method of realizing the described frequency-band relations will be explained hereinafter.

In view of the frequency characteristics just referred to, the self-quenching superregenerator 40 is excited by or responds to those radiation components from the separately quenched superregenerator 20 which fall within its response band $f_4$—$f_6$ and derives the desired modulation components thereof. This action of the self-quenching superregenerator in deriving the desired modulation components may be most readily understood by first considering the response at fixed frequency conditions and then observing the changes effected by frequency variations of the signal applied to terminals 10, 11.

If the amplitude, frequency and phase of the signal applied to terminals 10 and 11 remain fixed, the amplitude, frequency and phase of the pulse-modulation components in the radiation pattern of superregenerator 20 are likewise fixed. For such conditions, at the start of any negative-conductance interval of the self-quenching superregenerator 40 there are two signal components present in its tuned circuit 41, 42. The first component is the ringing signal carried over in the tuned circuit from the preceding negative-conductance interval by virtue of the low decrement of this circuit. The other component is the contribution to the tuned circuit of these pulse-modulation components of the radiation pattern of superregenerator 20 which fall within the response band $f_4$—$f_6$ of the self-quenching superregenerator. Together, these components determine the phase and effective amplitude of the resultant signal in the tuned circuit 41, 42 at the start of each negative-conductance interval. It is well understood that a self-quenching superregenerator has a self-quench frequency which varies in accordance with the amplitude of a wave signal applied thereto. This is because it is the amplitude of the applied signal which determines the initial amplitude of the oscillations in the tuned circuit of the superregenerator at the start of each negative-conductance interval. That action occurs in unit 40.

In other words, the oscillations generated in unit 40 in any quench cycle start from an initial value or amplitude level determined by the combined signal components previously referred to; that is, the components present in the tuned circuit at the beginning of each negative-conductance interval which is also the period of maximum sensitivity of the superregenerator. The oscillations quickly build up in amplitude to the saturation level and rectification in the control-electrode circuit of tube 43 causes a self-bias potential to be established on condenser 44 to block the tube and terminate the negative-conductance interval. The time required for this blocking action to occur after the initiation of a quench cycle determines the self-quenching frequency and varies with the initial amplitude of the oscillations in the tuned circuit 41, 42. Accordingly, for the fixed frequency conditions heretofore assumed, the self-quenching superregenerator 40 establishes a fixed self-quenching frequency for itself. As it does so, there is developed across the condenser 53 a voltage of this same quench frequency. This voltage is applied through the condenser 48 as a quench signal to the separately quenched superregenerator 20. The interrelated quench operation of the units 20 and 40 is such that the phase relations of the two signal components present in the tuned circuit 41, 42 in succeeding quench cycles are approximately the same. This may be considered as a phase-locked condition brought about by automatic adjustment of the quench frequency of each superregenerator when the frequency and phase of the applied signal at terminals 10, 11 remain fixed, as assumed, from one period of maximum sensitivity of unit 40 to the next.

If the phase of the signal applied to the input terminals 10, 11 should vary, the phase of the pulse-modulation components supplied from superregenerator 20 to superregenerator 40 varies accordingly. This change in phase manifests itself in a change in the amplitude and phase of the initiating signal of the self-quenching superregenerator at the next maximum-sensitivity period, that is, at the start of the next negative-conductance interval because the ringing component of tuned circuit 41, 42 adds vectorially to the signal supplied to that circuit by unit 20. Inherently, the self-quenching superregenerator thereupon modifies its self-quenching frequency because the speed with which the saturation level is attained varies with the change in initial amplitude of the generated oscillations. Since condenser 53 discharges each time tube 43 conducts, the quenching frequency which it develops and delivers to superregenerator 20 is simultaneously modified with the self-quenching frequency of unit 40 and the variation in these quench frequencies seeks to establish a new phase-locked condition determined by the new phase relations of the two signals present in tuned circuit 41, 42 at the start of each negative-conductance interval.

The radiation components from superregenerator 20 vary in phase from one sampling interval to the next in accordance with the phase changes of the signal applied to terminals 10, 11, the "sampling interval" being construed as the maximum-sensitivity period of unit 20 in each of its quench cycles. As a direct result, the phase relations of the carry-over or ringing component and of the exciting component supplied to tuned circuit 41, 42 from unit 20 are caused to vary in similar fashion from one comparing interval to the next, considering a "comparing interval" to be the maximum-sensitivity period of unit 40 in each of its quench cycles. Such phase changes as between successive comparing intervals modify the quench frequency of both superregenerators. For that reason, the quench signal of superregenerator 40 varies in accordance with the angular velocity modulation of the applied signal and may, if desired, be supplied to a frequency-modulation detector. However, the average value of the anode-cathode current of tube 43 also varies with the self-quenching frequency and, therefore, it includes the desired modulation components. Filter 52—53—54 suppresses from this signal obtained from tube 43 both the quench-frequency component and the oscillatory components and translates to output terminals 50, 51 the desired modulation components of the angular-velocity-modulated signal applied to terminals 10, 11.

The detector action of unit 40 may be viewed somewhat differently with reference to curve D of Fig. 2. This curve is in the nature of a multiple-resonance or response characteristic, presenting a series of sloping discriminator characteristics individually centered relative to one of the pulse-modulation components of that portion of the radiation pattern of curve A of superregenerator 20 which overlaps the response band $f_4$—$f_6$ of superregenerator 40. The variations in the self-quenching frequency of superregenerator 40 have been shown to be identical with the variations in the quenching frequency of the separately quenched superregenerator 20 because the quench signal for the latter is derived from the charging of condenser 53 from source +B and the discharging of that condenser through tube 43 in each quench cycle of unit 40. Such variations in the quenching frequencies tend to maintain each pulse-modulation component of the radiation pattern centered upon its assigned discriminator characteristic and the excursions of those components relative to their characteristics accomplish detection.

It has already been explained that the self-quenching frequency of unit 40 varies with the effective signal amplitude in its tuned circuit 41, 42 at the maximum-sensitivity period of each quench cycle. The frequency variation is in a degenerative sense, tending to establish a condition in which the effective signal amplitude in the tuned circuit 41, 42 is substantially constant at least when viewed on an average basis. That is analogous to maintaining a substantially fixed average apparent relative phase of the carry-over or ringing component of the circuit 41, 42 and the component supplied thereto from unit 20 in the sampling process carried out by the latter. The quench-frequency variation of the separately quenched superregenerator augments this effect and, on an average basis, a substantially fixed apparent phase tends to be established between the compared signal components, namely, the carry-over component of the circuit 41, 42 and the component supplied to that circuit from unit 20. This stabilizing effect, tending to establish a substantially fixed apparent phase relation, effectively crushes or compresses the frequency deviations of the side components of superregenerator 20, keeping them fairly centered on their discriminator characteristic as already mentioned.

In order more clearly to understand the stabilizing action, assume the frequency of the modulated signal to have increased, shifting all of the side-band components of superregenerator 20 higher in the frequency spectrum. This causes the side-band components to ride down their respective discriminator slopes. The effect of this displacement of the side-band components along the discriminator slopes is a reduction in the effective signal amplitude in superregenerator 40 and a related decrease in its quench frequency. Since units 20 and 40 are synchronously quenched, the former also experiences a reduction in quench frequency. Therefore, the frequency separation $\Delta f$ of the modulation side bands of its radiation spectrum is likewise reduced so that the side-band components are pulled in toward the oscillatory frequency $f_r$ of unit 20. As a result of this pulling in, the side-band components move back up along their discriminator slopes to restore the initial conditions. In other words, the system is degenerative and tends to stabilize, providing the phase-locked relations referred to above.

It has been explained that the self-quenching frequency of superregenerator 40 varies with the angular velocity modulation of the signal applied to terminals 10, 11. Therefore, the quench signal of that superregenerator represents a signal which is pulse-time-modulated in accordance with the modulation of the applied signal, the pulse time modulation being in the form of a variation in frequency or repetition rate. In like manner, the quench signal derived from condenser 53 and applied to the modulating or input circuit of tube 21 represents a pulse time modulation having a repetition rate varying in accordance with the angular velocity modulation of the applied signal.

Figure 3A:
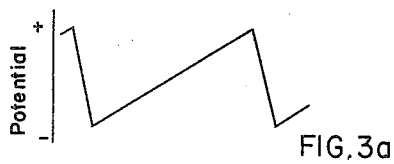
Figure 3B:
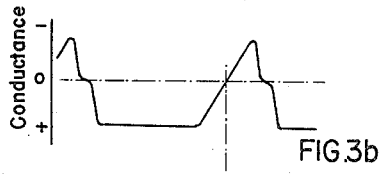
Figure 3C:
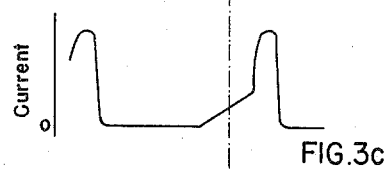
Figure 3D:
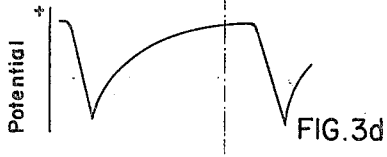
Figure 3E:
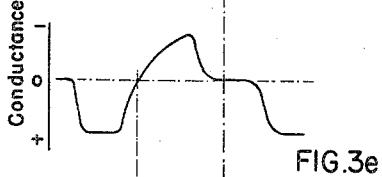
Figure 3F:
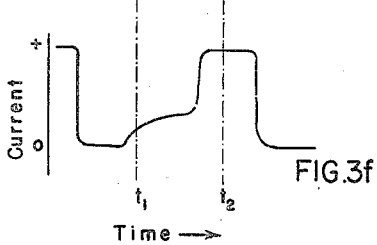

Wave forms of significant parameters of the described superregenerators are represented in the curves of Figs. 3a—3f. Fig. 3a shows the quench wave form of the self-quenching superregenerator 40. The steep portion indicates the accumulation of a charge on condenser 44 which blocks tube 43 to terminate the negative-conductance interval and the less steep portion indicates the discharge of the blocking potential through resistor 46 to complete the cycle of conductance variation indicated by the curve of Fig. 3b. Unit 40 makes a phase comparison during a comparing interval which occurs at the point of maximum sensitivity, indicated at the time $t_2$, when the oscillatory circuit has zero conductance in a transition from a positive to a negative value. Current flow through tube 43 is also another type of a pulse-modulated signal, as indicated in Fig. 3c. The periodic charging and discharging of condenser 53 develop the quenching signal of Fig. 3d which is applied to the control electrode of tube 21 in superregenerator 20. It establishes in the latter the cycle of conductance variations represented in Fig. 3e and produces the point of maximum sensitivity and a sampling interval for the first superregenerator at the time $t_1$. The space current of tube 21 is represented by the curve of Fig. 3f. Of course, the curves of Figs. 3a—3f are repeated periodically, but for convenience only, a little more than one complete cycle has been shown.

The signal applied to the input terminals 10, 11 is sampled at the time $t_1$ by the first superregenerator 20 and the phase comparison is made at the time $t_2$ in the second superregenerator 40. The comparing intervals in the described arrangement alternate with and are spaced from corresponding ones of the sampling intervals. The comparison made is between the reference oscillations in tuned circuit 41, 42 which represent the phase in one sampling interval and the components supplied by superregenerator 20 in the next succeeding interval so that the comparison indicates the change of phase in successive samples.

The relation of the frequency bands of Fig. 2, representing the frequency-response and radiation characteristics of superregenerator 20 on the one hand and the frequency response of superregenerator 40 on the other, may be chosen by appropriately shaping the wave form of the quench signals. Where the quench signal of either superregenerator is shaped to produce a slow rate of change of conductance at zero conductance in a transition from a positive to a negative value the selectivity characteristic is narrow band. The duration of the anode-current saturation pulse in any negative-conductance interval determines the frequency band width of the radiation pattern. Control of these factors permits the desired correlation of the significant frequency bands represented in Fig. 2 and may be obtained through the use of wave forms of the type discussed in connection with the curves of Figs. 3a—3f. More particularly, selection of the circuit parameters in the grid circuit of tube 43 determines the quench wave shape of unit 40, while resistor 45 and condenser 53 may be chosen to shape the quench signal of unit 20.

The time $t_1$ when the superregenerator 20 has its maximum sensitivity occurs during the positive-conductance interval of superregenerator 40, as indicated in the curves of Figs. 3b and 3e. When unit 40 experiences positive conductance, it radiates only its ringing component which is at the resonant frequency of circuit 41, 42. If that frequency is chosen to be outside of the response band of unit 20, the latter is not influenced by radiation from unit 40.

As shown particularly by the curves of Figs. 3b and 3f the superregenerators are quenched so that the oscillations generated in a given quench cycle by superregenerator 20 attain saturation-level amplitude before the interval $t_2$ of maximum sensitivity of the self-quenching superregenerator 40. Where this condition is realized, the effects of amplitude modulation of the applied signal are reduced. Also, with this adjustment, there is no appreciable deterioration of the signal-to-noise ratio of the receiver even though high-order pulse-modulation components of the first superregenerator are detected in the second superregenerator.

It is not necessary that unit 20 be in a condition of saturation-level oscillation at the time $t_2$ of maximum sensitivity of unit 40. By modifying the time sequence of these units, the superregenerator 20 may achieve maximum amplitude of oscillation when the other superregenerator 40 has attained saturation-level amplitude. In that mode of operation the phase comparison (of the carry-over component of circuit 41, 42 and the selected output of unit 20) is made at a high signal level, after both units have reached saturation-level amplitude. The relative phase of the compared signals determines the duration of the saturation-level interval of unit 40 and controls its self-quenching frequency. Thus, the operation is quite similar to that previously described and the quench-frequency variations of units 20 and 40 tend to maintain (on an average basis) a substantially fixed apparent phase relation of the compared signals. Also, if desired, the frequency control employed to establish that apparent phase relation may be supplemented by a reactance tube coupled to circuit 41, 42 and responsive to the modulation output of unit 40.

It may be shown that if the frequency of the signal applied to terminals 10, 11 is separated in the frequency spectrum from the oscillating frequency of the self-quenching superregenerator 40 by an integral number ($n$) of quench cycles, a reduction in the quench-frequency deviation is obtained. Specifically, the frequency deviations of the quench frequency of both superregenerators will be $1/n$ times the deviation of the applied signal.

A modified form of the invention is represented in Fig. 4, this system being very similar to the arrangement represented in Fig. 1 of applicant's Patent 2,513,731 granted July 4, 1950, and entitled "Frequency-Responsive System." The Fig. 4 arrangement has input terminals 110 and 111 to which the angular-velocity-modulated signal is applied and output terminals 150 and 151 where the derived modulation components are presented. A first pulse-modulated amplifier 120 has an input circuit connected with terminals 110, 111 and an output circuit connected with a low-decrement oscillatory circuit 141. The output circuit of the latter is connected with a first input circuit of a phase comparator 140. The input terminals 110, 111 are also connected to an input circuit of a second pulse-modulated amplifier 121 having an output circuit connected with a second input circuit of the phase comparator. The operation of the pulse-modulated amplifier 120 and 121 is under the control of a pulse-signal source 122 which determines the pulse translation intervals of those amplifiers. This much of the arrangement of Fig. 4 is essentially the same as that disclosed in the above-mentioned Patent 2,513,731 and reference may be had thereto for a complete description of the detection on the basis of a phase comparison.

In order to convert from angular velocity modulation to pulse time modulation, the system of the present application is modified to include a multivibrator 123 having a synchronizing input circuit coupled to source 122 and a differentiator and limiter 124 coupled to the output circuit of the multivibrator. A second pulse-signal source 125 directly controls the pulsed operation of amplifier 121, source 125 having a keying circuit which is coupled to the differentiator and limiter.

Figure 5A:
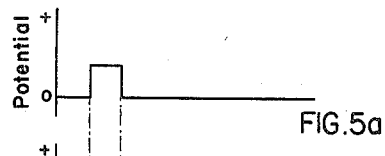

The operation of the arrangement of Fig. 4 in converting from angular velocity modulation to pulse time modulation will be explained with reference to the curves of Figs. 5a–5d, inclusive. The pulse of Fig. 5a represents the control pulse from source 122 which keys pulse amplifier 120 to sample the signal applied to input terminals 110, 111 and to generate in resonant circuit 141 the reference signal having a phase dependent upon the phase of the applied signal during the sampling interval. This same pulse as applied to multivibrator 123 starts the generation of the pulse of Fig. 5b. Differentiation of that pulse in unit 124 provides the positive and negative pulses shown in full-line construction in Fig. 5c. The limiter of unit 124 passes only the negative pulse to key the second source 125 to apply to pulse amplifier 121 the control pulse shown in full-line construction in Fig. 5d.

For the conditions thus far described the applied signal is sampled during the interval $t_1$—$t_2$ by amplifier 120, and resonant circuit 141 is excited thereby and rings. At a later interval $t_3$—$t_4$ the earlier sampled portion of the applied signal, represented by the ringing component of circuit 141, is compared in phase comparator 140 with the portion of the applied signal occurring within the interval $t_3$—$t_4$ and supplied to phase comparator 140 by amplifier 121. The comparison determines the change of phase and develops the modulation output supplied to terminals 150, 151.

Figure 5B:
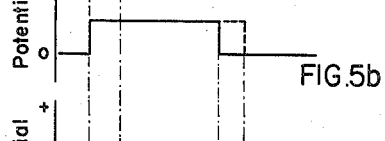
Figure 5C:
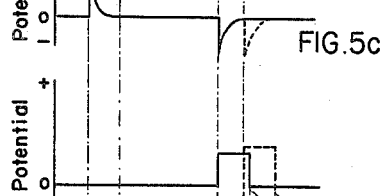
Figure 5D:
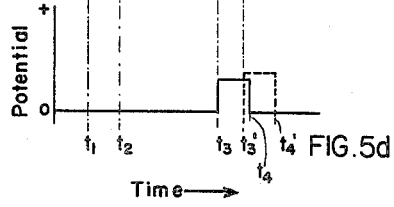

The modulation output is essentially a unidirectional potential and is also applied to a control circuit of multivibrator 123 to determine the time relationship of the trailing edge of the pulse of Fig. 5b. In other words, the control of the multivibrator 123 by the response of the phase comparator 140 causes the duration of the pulse of Fig. 5b to vary in accordance with the angular velocity modulation of the applied signal. It may, for example, increase the pulse duration as represented by the broken-line curve of Fig. 5b. Where that occurs, the broken-line curves of Figs. 5c and 5d indicate the change in the time of the comparing interval. Specifically, the latter shifts to the new value $t_3'$—$t_4'$. Thus, units 123 and 124 together constitute a timing generator responsive to the output signal of the comparator 140 for applying timing pulses to the source 125 to vary the time separation of successive comparing intervals in accordance with the modulation of the angular-velocity-modulated signal applied to terminals 110, 111. In this manner the angular velocity modulation is converted to pulse time modulation.

In order to avoid a phase ambiguity in the above-described arrangements, there is a limitation to be observed with reference to the deviation of the applied angular-velocity-modulated signal. If the applied signal has a given instantaneous frequency and phase at one sampling interval, its frequency and phase at the next comparing interval when compared with that of the first-mentioned interval preferably should not represent a phase change of more than ±180°. This may be assured by using a sufficiently high mean quench frequency in the arrangement of Fig. 1 and by having the interval $t_1$—$t_3$ of Fig. 4 relatively small.

Each embodiment of the invention derives the modulation components of an applied angular-velocity-modulation signal and at the same time effects a conversion of the angular velocity modulation into pulse time modulation.

In both described modifications of the invention the angular-velocity-modulated signal is sampled and the modulation components are derived on the basis of a phase comparison between the sample of the modulated signal and reference oscillations developed in a low-decrement circuit (41, 42 in Fig. 1 and 141 in Fig. 4). In general, each phase comparison interval is spaced from the corresponding sampling interval, that is, the phase of any particular sample of the modulated signal is compared with a reference in a comparison interval which is spaced from that particular sampling interval. Of course, where the phase-reference signal is developed in a low-decrement oscillatory circuit as described, the comparison must be made while the reference has an appreciable amplitude. This condition is satisfied by having the effective time constant of damping of the oscillatory circuit such that the ringing component or damped transient of the circuit (following any excitation thereof) has an appreciable amplitude throughout a given interval and by having each comparing interval occur within a particular ringing interval of the oscillatory circuit. Such conditions are realized in the arrangements of Figs. 1 and 5.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An angular-velocity-modulation wave-signal translating system of the sampling type comprising: an externally quenched superregenerative wave-signal repeater for sampling the phase of an applied angular-velocity-modulated signal during each of a series of spaced sampling intervals; an oscillatory circuit coupled to said repeater to develop a reference signal having a phase dependent upon the phase of the output signal of said repeater and having an effective time constant of damping exceeding the maximum separation of said sampling intervals; a phase comparator comprising a self-quenching superregenerator including said oscillatory circuit and effectively responsive to said reference signal and to said applied signal during a series of comparing intervals which alternate with and are spaced from corresponding ones of said sampling intervals for developing a third signal having a frequency corresponding to the self-quenching frequency of said self-quenching superregenerator and varying with the relative phase of said applied signal and said reference signal; and means for applying said third signal as a quench signal to said repeater to determine the repetition frequency of said sampling intervals.

2. An angular-velocity-modulation wave-signal translating system of the sampling type comprising: a separately quenched superregenerative wave-signal repeater for sampling the phase of an applied angular-velocity-modulated signal during each of a series of spaced sampling intervals, said repeater being responsive to signals within a first frequency band including the frequency range of said applied signal and having a radiation pattern extending over a second frequency band; an oscillatory circuit coupled to said repeater to develop a reference signal having a phase dependent upon the phase of the output signal of said repeater and having an effective time constant of damping exceeding the maximum separation of said sampling intervals; a phase comparator comprising a self-quenching superregenerator including said oscillatory circuit and effectively responsive to said reference signal and to said applied signal during a series of comparing intervals which alternate with and are spaced from corresponding ones of said sampling intervals for developing a third signal having a frequency corresponding to the self-quenching frequency of said superregenerator and varying with the relative phase of said applied signal and said reference signal, said self-quenching superregenerator being responsive to signals included within said second frequency band and having an oscillating frequency which is effectively outside of said first frequency band; and means for applying said third signal as a quench signal to said repeater to control at least one of the characteristic time components of said sampling intervals.

3. An angular-velocity-modulation wave-signal translating system of the sampling type comprising: a separately quenched superregenerative wave-signal repeater for sampling the phase of an applied angular-velocity-modulated signal during each of a series of spaced sampling intervals, said repeater being responsive to signals within a first frequency band including the frequency range of said applied signal and having a radiation pattern extending over a second frequency band; an oscillatory circuit coupled to said repeater to develop a reference signal having a phase dependent upon the phase of the output signal of said repeater and having an effective time constant of damping exceeding the maximum separation of said sampling intervals; a phase comparator comprising a self-quenching superregenerator including said oscillatory circuit and effectively responsive to said reference signal and to said applied signal during a series of comparing intervals which alternate with and are spaced from corresponding ones of said sampling intervals for developing a third signal having a frequency corresponding to the self-quenching frequency of said superrengerator and varying with the relative phase of said applied signal and said reference signal, said self-quenching superregenerator being responsive to signals included within said second frequency band, having an oscillating frequency which is effectively outside of said first frequency band, and having a positive conductance during each of said sampling intervals; and means for applying said third signal as a quench signal to said repeater to control at least one of the characteristic time components of said sampling intervals.

4. An angular-velocity-modulation wave-signal translating system of the sampling type comprising: a separately quenched superregenerative wave-signal repeater operating at saturation-level mode for sampling the phase of an applied angular-velocity-modulated signal during each of a series of spaced sampling intervals, said repeater being responsive to signals within a first frequency band including the frequency range of said applied signal and having a radiation pattern extending over a second frequency band; an oscillatory circuit coupled to said repeater to develop a reference signal having a phase dependent upon the phase of the output signal of said repeater and having an effective time constant of damping exceeding the maximum separation of said sampling intervals; a phase comparator comprising a self-quenching superregenerator including said oscillatory circuit and effectively responsive to said reference signal and to said applied signal during a series of comparing intervals which alternate with and are spaced from corresponding ones of said sampling intervals for developing a third signal having a frequency corresponding to the self-quenching frequency of said superregenerator and varying with the relative phase of said applied signal and said reference signal, said self-quenching superregenerator being responsive to signals included within said second frequency band, having an oscillating frequency which is effectively outside of said first frequency band, having maximum sensitivity during saturation intervals of said repeater, and having a positive conductance during each of said sampling intervals; and means for applying said third signal as a quench signal to said repeater to control at least one of the characteristic time components of said sampling intervals.

5. A receiving system of the phase comparison type for translating an angular-velocity-modulated wave signal comprising: a source of phase-reference oscillations; a superregenerative amplifier to which said modulated signal is applied and effective in each quench cycle to generate oscillations having a phase varying with the phase of said modulated signal; a phase detector comprising a blocking oscillator including said source for receiving said oscillations of said amplifier and for comparing during spaced intervals the apparent phase of said reference oscillations and said amplifier oscillations to develop an output signal having characteristic variations representing the modulation components of said modulated signal; and a control network responsive to the phase relations of said reference oscillations and said amplifier oscillations during said intervals of phase comparison for controlling a frequency characteristic of said system to tend to maintain a substantially fixed apparent phase relation between said reference oscillations and said amplifier oscillations.

6. A receiving system of the phase comparison type for translating an angular-velocity-modulated wave signal comprising: a source of phase-reference oscillations; a superregenerative amplifier to which said modulated signal is applied and effective in each quench cycle to generate oscillations having a phase varying with the phase of said modulated signal; a superregenerative phase detector including said source for receiving said oscillations of said amplifier and for comparing during spaced intervals the apparent phase of said reference oscillations and said amplifier oscillations to develop an output signal having characteristic variations representing the modulation components of said modulated signal; and a control network responsive to the phase relations of said reference oscillations and said amplifier oscillations during said intervals of phase comparison for controlling a frequency characteristic of said system to tend to maintain a substantially fixed apparent phase relation between said reference oscillations and said amplifier oscillations.

BERNARD D. LOUGHLIN.

REFERENCES CITED

The following references are of record in the file of this patent:

UNITED STATES PATENTS

| Number | Name | Date |
|---|---|---|
| 2,273,090 | Crosby | Feb. 17, 1942 |
| 2,357,975 | Roberts | Sept. 12, 1944 |
| 2,363,571 | Chaffee | Nov. 28, 1944 |
| 2,413,023 | Young | Dec. 24, 1946 |
| 2,425,314 | Hansell | Aug. 12, 1947 |
| 2,445,584 | Ramo | July 20, 1948 |
| 2,451,291 | Koch | Oct. 12, 1948 |
| 2,465,341 | Altovsky | Mar. 29, 1949 |

OTHER REFERENCES

Kalmus; Some Notes on Superregeneration, Proc. IRE, October 1944, pages 591 to 600.